United States Patent
Peter et al.

[11] 3,776,651
[45] Dec. 4, 1973

[54] HUB CONNECTION FOR USE WITH HOLLOW SHAFTS

[75] Inventors: Oskar E. Peter, Schlosstrasse 9/I, Brackenheim; Lothar Peter, Guglingen, Wurttemberg, both of Germany

[73] Assignee: said Oskar E. Peter, by said Lothar Peter

[22] Filed: Apr. 21, 1972

[21] Appl. No.: 246,199

[30] Foreign Application Priority Data
Sept. 23, 1971 Germany.................. P 21 47 501.4

[52] U.S. Cl.............403/248, 403/277, 403/370
[51] Int. Cl............................................. F16d 1/06
[58] Field of Search ............ 279/2; 287/124, 52.06, 287/20.3, 53 R

[56] References Cited
UNITED STATES PATENTS
2,360,968 10/1944 Mundy............................. 279/2 UX
2,960,342 11/1960 Raper............................. 287/124 X
3,360,276 12/1967 Peffer........................ 279/2

FOREIGN PATENTS OR APPLICATIONS
680,768 9/1939 Germany......................... 287/53 R Primary Examiner—Andrew V. Kundrat
Attorney—Flynn & Frishauf

[57] ABSTRACT

To secure a hub on a hollow shaft, a sleeve adapted to fit into the hollow shaft has, at one end, a cylindrical collar which is adapted to fit into the bore of the hub. The outer end of the collar has a serrated surface, and a portion of the outer surface of the sleeve, adjacent the collar, is likewise serrated, the serrations terminating in a groove, and the remainder of the sleeve being smooth. The sleeve has an inner conical surface into which a conical tension plug fits which, when tightened against a counter element, expands the sleeve and causes the serrated surfaces to bind against the inner surface of the shaft, and against the bore of the hub, respectively, the smooth surface of the sleeve centering and additionally frictionally engaging the shaft. In a preferred form, the tightening screw is an Allen head bolt which is constrained against axial movement in a recess of the bolt, so that upon loosening movement of the bolt, the conical plug will disengage from the inner conical surface, and so that the connection can be released without further tools. A plastic or oil-resistant disk can be inserted between the counter elements for the bolt and the conical plugs to make the connection fluid-tight.

9 Claims, 3 Drawing Figures

HUB CONNECTION FOR USE WITH HOLLOW SHAFTS

The present invention relates to a hub-to-shaft connection and more particularly to secure a hub on a hollow shaft, in which a conical element is used to provide for frictional engagement of the hub to the shaft.

Hub-to-shaft connections frequently use friction to provide for torque transmission between the hub and the shaft — see, for example, U.S. Pat. No. 1,903,060. Frictional interengagement between the hub and the shaft does not, however, permit transmission of high torques. After tightening conical, or slightly tapering elements against each other, the engagement between the hub and the shaft is frequently not entirely uniform. Engagement of cones against an inner slit hollow shaft, or similar element, which permits outer expansion also does not transmit forces over the entire circumference, and bearing of a flattened tensioning cone at the inner end of a slit hollow shaft undesirably affects the strength of the shaft. The hub applied on the shaft thus is secured at a weakened point thereof.

It is an object of the present invention to provide a hub-to-hollow shaft connection in which high torques can be transmitted, and in which the shaft, itself, is not weakened.

Subject matter of the present invention

Briefly, a sleeve is provided which, at the outer end, is formed with a collar. A portion of the circumference of the sleeve is serrated, and the circumference of the collar, likewise, is serrated. The serrations terminate in a terminal groove. The serrated collar fits within the bore of the shaft and preferably has an outer circumference matching the outer circumference of the shaft. The serrated portion of the circumference of the sleeve fits within the shaft. The inner surface of the sleeve is conical, and a conical plug is inserted which can be tightened against a counter element bearing against an inner shoulder of the sleeve, for example a separate disk, nut, or the like. Upon tightening of a central bolt, the conical plug is moved against the inside of the sleeve, expanding the sleeve and causing the serrations to bite both into the hub, as well as into the shaft, to provide a secure interconnection between the hub and the shaft capable of transmitting high torque.

The bolt to tighten the inner conical plug against the inner conical surface of the sleeve is preferably an Allen head bolt. The sleeve is preferably completely closed circumferentially although it may, if desired, be slit axially, the slit, however, being preferably essentially closed so that expansion of the sleeve, when the conical plug is tightened against the inner conical surface will not leave a substantial gap around its circumference.

The structure in accordance with the present invention provides a combined connection for a hub to a shaft which at the same time locates the hub with respect to the shaft while being capable of transmitting substantial torques, and centering the hub on the shaft. The radial pressure is essentially uniformly applied to the circumference of the hollow shaft and to the hub. Insertion of the conical plug at the forward end into the sleeve provides greater radial pressure at the outer end of the hollow shaft and against the hub, which is the point where in the majority of hub-to-shaft connections, the major portion of the torque is being transmitted. This arrangement thus provides for large transmission of torque and high resistance to changes in torque, or loading under shock.

The hub-to-shaft connection in accordance with the present invention may be used not only for direct connection of a hub to a shaft but may likewise be used in the form in which the sleeve does not have one axially centered conical bore, but a plurality of conical bores located in a planetary arrangement about the center of the shaft, in order to provide higher axial forces and to enable transmission of high torques from large hollow shafts to large hubs.

The hub-to-shaft connection, in accordance with the present invention can of course also be used with solid shafts which have a blind bore at the end into which the connection can be inserted. The interconnection itself is simple and can be made on automatic screw machines or automatic lathes at high speed and low cost.

The invention will be described by way of example with reference to the accompanying drawings, wherein.

Figure 1:
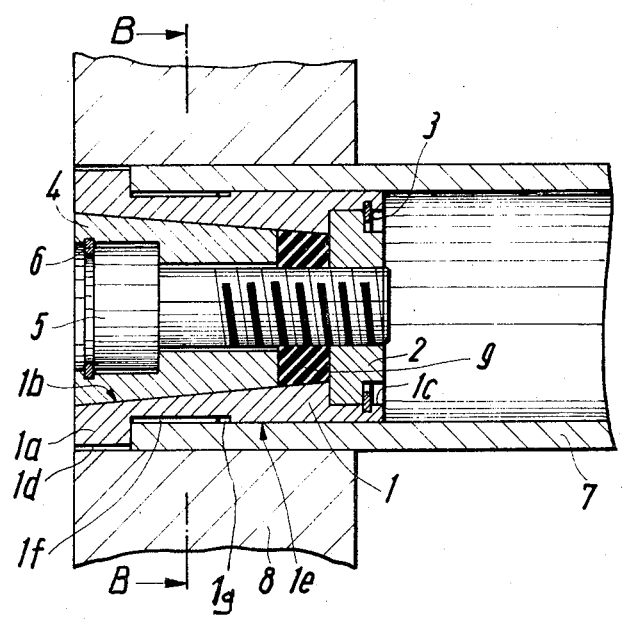
FIG. 1 is a schematic longitudinal cross-sectional view through the hub-to-shaft connection, illustrating the hub, the sleeve, the shaft, and the cone, and having an intermediate elastic disk which may be used as a fluid seal, the illustration showing a single central bolt for tightening of the conical plug.

The hub-to-shaft connection is utilized to connect a hub 8 on a shaft 7 which is hollow, or has a terminal bore. A sleeve 1 has a cylindrical collar 1a at the outer end thereof. The sleeve 1 can be a completely closed sleeve, or it can have an axially extending slit, throughout its length, or through a part thereof. The sleeve 1 is formed with an inner conical bore 1b, terminating at its interior end in an offset larger bore 1c, to form a shoulder into which terminal disk 2 can be inserted. Disk 2, which can be in form of an end nut to be restrained against rotation with respect to the sleeve is held in position by means of a C-ring 3 snapped into a groove formed in the sleeve 1. Other counter arrangements can be used.

Figure 2:
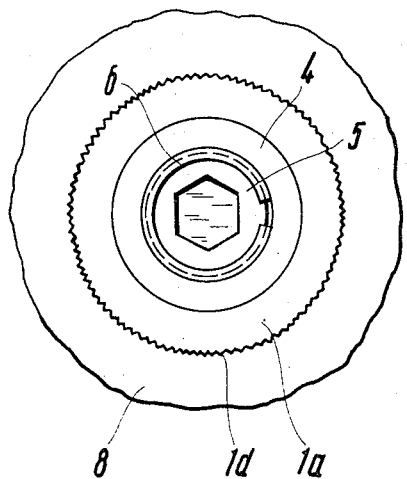
FIG. 2 is a front view of the connection of FIG. 1.
Figure 3:
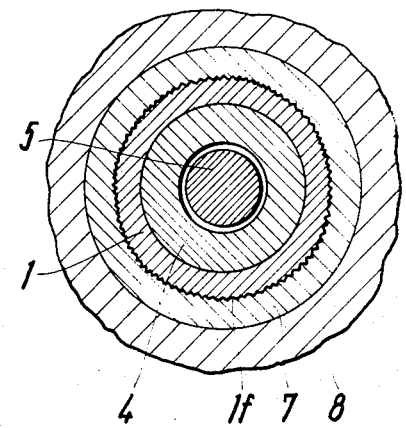
FIG. 3 is a transverse cross section taken along line B—B of FIG. 1.

The cylindrical collar 1a of sleeve 1 has a serrated surface 1d (see FIG. 2). The serrations extend parallel to the axis of the sleeve. The outer portion of the sleeve 1 further is formed with a serrated surface 1f, which terminates in a circumferential groove 1g. Serrations 1f also extend parallel to the axis of the sleeve. The terminal surface portion 1e of sleeve 1 is cylindrical and smooth.

A tightening plug 4, in form of a cone, is inserted into the conical bore 1b of the sleeve. The plug 4 has an outer recess formed therein into which the head of an Allen head bolt 5 fits. The Allen head bolt is screwed into the terminal disk 2, so that, upon tightening of the head against disk 2, the cone 4 will be moved to the right, FIG. 1, causing the its wider end to effect expansion of sleeve 1. The cylindrical head of the recess head bolt 5 is secured against axial movement by means of a C-ring 6 snapped into a groove formed in the outer recess of plug 4 for the head of the Allen bolt 5. An elastic disk 9 of oil-resistant rubber, plastic, or other compressible material, is inserted between the inner end of plug 4 and disk 2 to provide for fluid seal.

The completely assembled hub-to-shaft connection is so arranged that the outer surface thereof is flush with the outer surface of the hub 8, the serrations 1d on the collar 1a matching the diameter of the bore of the hub.

To secure a hub to the shaft, the connection sleeve 1 with the plug 4, and bolt 5 inserted therein, is slid into the shaft 7, the non-serrated smooth portion of the sleeve centering the sleeve within the shaft 7. The hub is then placed over the shaft 7, and flush with the outer face of sleeve 1. Upon tightening the bolt 5, cone 4 is drawn into the interior of the sleeve 1. Upon increasing radial pressure, the serration 1d on the collar 1a will grip the bore of the hub, and deform, to form a tight fit. The serrations 1f will grip the inner surface of the shaft 7 and likewise will be pressed into the shaft 7, to be deformed, and bite into the shaft, just as the serrations 1d on the collar 1a bite into the bore of the hub. The smooth cylindrical surface 1e on the sleeve will be frictionally engaged in the interior of the shaft 7 in radial direction, so that the interconnection between the hub and the shaft will be free of play, exactly centered, and high torques can be transmitted due to the engagement of the serrations 1d, 1f. To remove the interconnection, rotation of the bolt 5 in unscrewing direction will cause the head of the bolt 5 to bear against the C-ring 6, so that the conical frictional engagement, and expansion of the sleeve 1 will be released, and removal of the hub from the shaft becomes possible without further use of tools. Pressure towards the left (FIG. 1) upon unscrewing of the bolt 5 will cause loosening of the conical plug 4.

The interconnection can be utilized for shafts and hubs having a large diameter by providing a number of plugs 4, and bolts 5, located in planetary arrangement around the center axis of the shaft 7. If such arrangements are used, then the cones 4 may be formed with threaded bores if self-binding conical surfaces are provided, in order to permit loosening of the sleeve without further removal tools. The C-rings 6 bearing against the head 5 of the bolts can then be omitted. The bolt 5 may then be free to rotate within the counter disk 2, being, however, axially restrained from movement with respect thereto, in order to provide axial movement of the cones or plugs 4.

We claim:

1. Hub connection to connect a hub (8) to a shaft (7) having a bore therein comprising a sleeve (1) adapted to fit into the hollow shaft and having a cylindrical collar (1a) adapted to fit into the bore of the hub located at the outer end of the sleeve, the collar being formed with an outer serrated surface (1d), a portion of the outer surface of the sleeve adjacent the collar being formed with an outer serrated surface (1f), and another portion of the outer surface of the sleeve being smooth, the sleeve having an inner conical surface (1b);

a conical tensioning plug (4) inserted into the sleeve (1), the tensioning plug being formed with a bore therethrough;

and means (2, 5) to tighten the conical plug (4), into the conical inner surface (1b) of the sleeve (1) to effect engagement of the serrated surfaces (1d, 1f) with the inner surface of the hub (8) and of the shaft (7) respectively, the smooth surface (1e) of the sleeve centering the sleeve into the hollow of the shaft and frictionally engaging the inner surface thereof.

2. Connection according to claim 1, including a circumferential groove (1g) at the end of the serrated surface (1f) portion of the sleeve and separating said serrated surface (1f) from the smooth surface (1e) of the sleeve.

3. Connection according to claim 1, wherein the serrations are parallel to the axis of the sleeve.

4. Connection according to claim 1, wherein the tightening means comprises a screw (5) extending through the plug (4);

and a threaded counter element (2) seated against the inner end of the sleeve (1).

5. Connection according to claim 4, further comprising an inner shoulder formed at the interior end of the conical surface of the sleeve, the threaded counter element (2) being seated against said inner shoulder;

and including means (3, 6) retaining the screw and the counter element in position in the plug and the sleeve, respectively, to permit loosening of the hub-to-shaft interconnection upon unscrewing rotation of the screw to thereby move the conical plug out of clamping engagement with the conical inner surface of the sleeve.

6. Connection according to claim 5, wherein the retaining means comprises C rings.

7. Connection according to claim 4, further comprising a disk of elastically compressible material essentially completely filling the space between the inner terminal end of the plug and the counter element.

8. Connection according to claim 7, wherein the elastically compressible material is a plastic or oil-resistant rubber.

9. Connection according to claim 1, wherein the tightening means comprises an Allen head bolt.

* * * * *